(No Model.)

C. S. HAMLIN.
SHEET METAL PIPE BELL LOCK JOINT.

No. 498,210. Patented May 23, 1893.

Witnesses.
P. W. Harbison.
F. M. Townsend.

Inventor.
Charles S. Hamlin
by Hazard & Townsend
his Atty

UNITED STATES PATENT OFFICE.

CHARLES S. HAMLIN, OF LOS ANGELES, ASSIGNOR OF ONE-HALF TO ARTHUR C. HARPER, OF UNIVERSITY, CALIFORNIA.

SHEET-METAL PIPE-BELL LOCK-JOINT.

SPECIFICATION forming part of Letters Patent No. 498,210, dated May 23, 1893.

Application filed January 28, 1893. Serial No. 459,934. (No model.)

*To all whom it may concern:*

Be it known that I, CHARLES S. HAMLIN, a citizen of the United States, residing at Los Angeles, in the county of Los Angeles and State of California, have invented a new and useful Sheet-Metal Pipe-Bell Lock-Joint, of which the following is a specification.

The object of my invention is to provide a perfect joint for uniting sheet metal pipe for conveying liquids, gas, &c.; also to accomplish this object by cheap and simple means whereby the joint can be conveniently formed at the time of laying the pipe; also to form a joint of great strength and one which will hold against longitudinal strain and will not pull apart under great pressure. I accomplish this object by the means described herein and illustrated in the accompanying drawings, in which—

Figure 1:
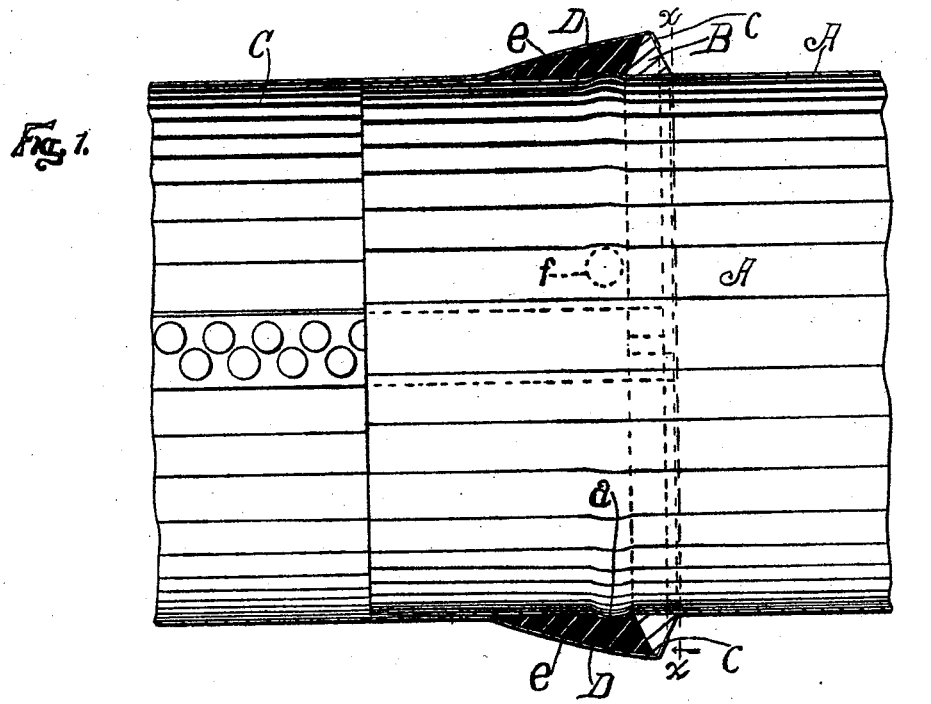
Figure 2:
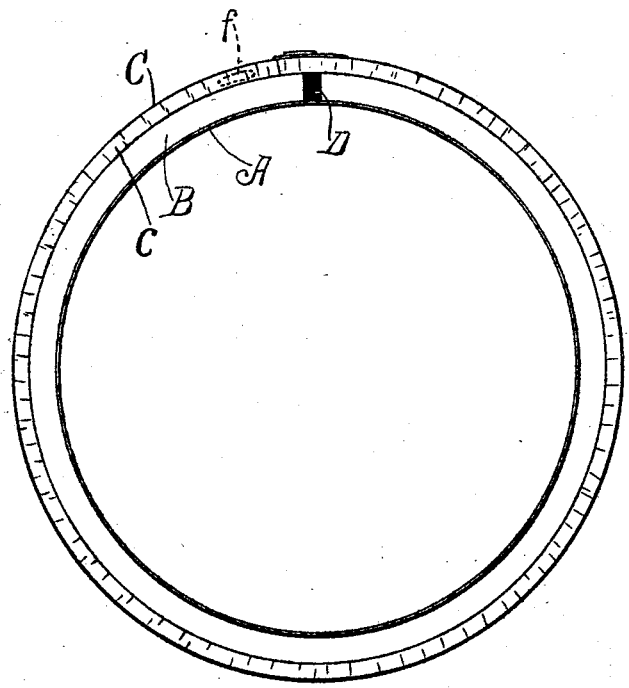

Figure 1 is a longitudinal section of my pipe joint complete. Fig. 2 is a transverse section on line $x$—$x$.

My pipe joint comprises the combination of the male member A provided with one or more beads $a$; the metal ring B arranged around the male member, the female member C embracing the end of the male member and the ring thereon and having its end turned over the ring to form the retaining rim $c$, and the filling D of brea, asphaltum or other suitable material within the chamber $e$ formed by the ring and the male and female members.

In practice the pipe is laid with the ring placed upon the male member and the male member is inserted into the bell of the female member and the joint is heated in the ordinary way by burning oil and the male member is then driven home. The ring is then driven into place within the bell and the retaining rim $c$ is turned down and hammered into form over the edge of the ring. The ring wedges in between the bell and the bead $a$ and, in connection with the rim $c$, forms a perfect lock joint. Then the chamber $e$ is filled with melted brea or asphaltum poured through a hole $f$ provided in the bell for that purpose. Care must be had that the joint is warm enough to allow the asphaltum to flow freely to fill the chamber. When the chamber is filled, the joint is then complete and is proof against leakage, and the joint will not pull apart.

The ring B as shown is an open ring made of wrought metal bent into annular form with the two ends free so that the ring is free to expand or contract to fit the pipe. The space between the ends will become filled with the asphaltum when the same is poured into the chamber $e$. As shown the ring is triangular in cross section being beveled from its inner face to its periphery so that it will wedge into the bell and will not require the end of the bell to be bent so much to form the rim $c$ as would be required if the end of the ring were at right angles to its axis.

Now, having described my invention, what I claim as new, and desire to secure by Letters Patent, is—

1. The pipe-joint set forth comprising the combination of the male member; the ring arranged around the male member; the female member embracing the end of the male member and the ring thereon and having its end turned over the ring to form the retaining rim, and the filling within the chamber formed by the ring and the male and female members.

2. The pipe-joint set forth comprising the combination of the beaded male member; the ring arranged around the male member; the female member embracing the end of the male member and the ring thereon and having its end turned over the ring to form the retaining rim, and the filling within the chamber formed by the ring and the male and the female members.

3. The pipe-joint set forth comprising the combination of the male member; the open ring arranged around the male member; the female member embracing the end of the male member and the ring thereon and having its end turned over the ring to form the retaining rim, and the filling within the chamber formed by the ring and the male and female members.

4. The pipe-joint set forth comprising the combination of the male member; the beveled open ring arranged around the male member; the female member embracing the end of the male member and the ring thereon and having its end turned over the ring to form the retaining rim, and the filling within the chamber formed by the ring and male and female members.

5. The pipe-joint set forth comprising the combination of the beaded male member; the open ring arranged around the male member; the female member embracing the end of the male member and the ring thereon and having its end turned over the ring to form the retaining rim, and the filling within the chamber formed by the ring and the male and the female members.

CHARLES S. HAMLIN.

Witnesses:
JAMES R. TOWNSEND,
ALFRED I. TOWNSEND.